March 27, 1928.
H. M. STOLLER
1,663,890
ELECTRICAL CONTROL SYSTEM
Original Filed Nov. 19, 1924
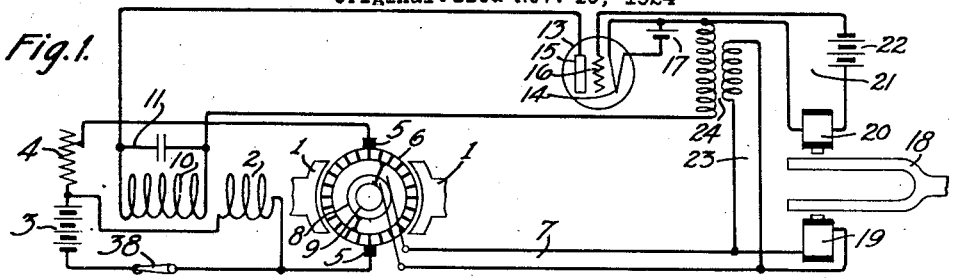
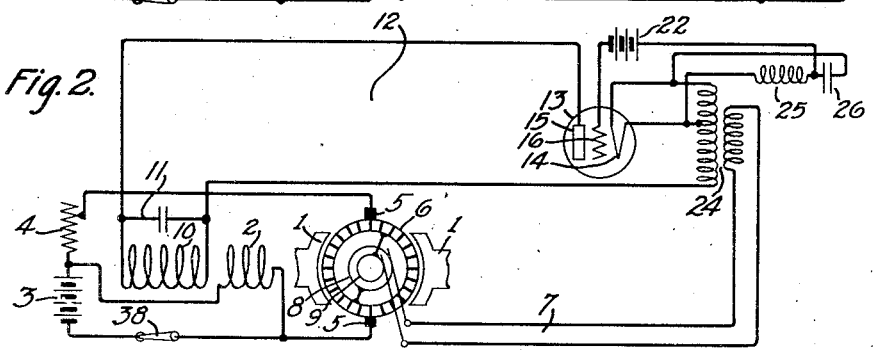
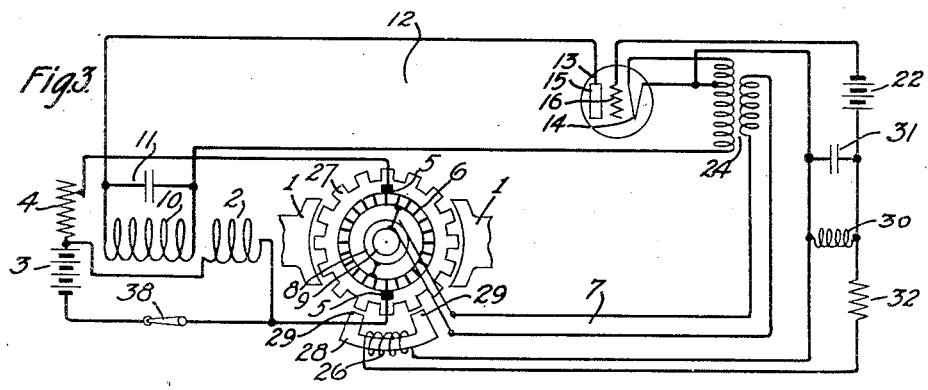
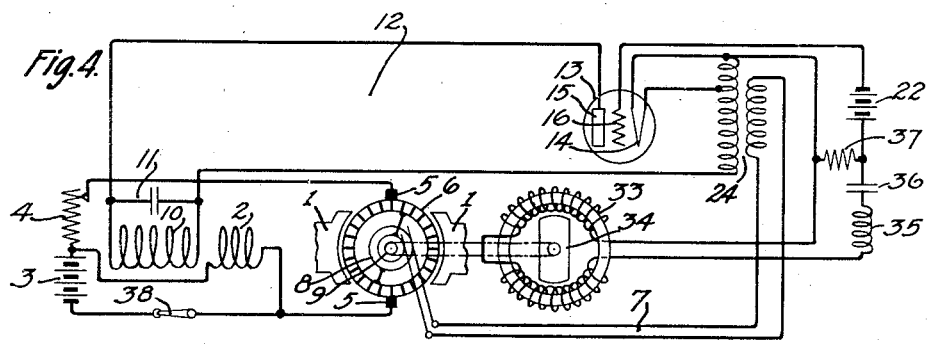
Inventor:
Hugh M. Stoller
by E. W. Adams Atty.

Patented Mar. 27, 1928.

1,663,890

UNITED STATES PATENT OFFICE.

HUGH M. STOLLER, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

ELECTRICAL CONTROL SYSTEM.

Application filed November 19, 1924, Serial No. 750,857. Renewed December 8, 1927.

This invention relates to electrical control systems and particularly to systems for controlling the speed of dynamo-electric machines.

It is applicable to the quantitative control of a characteristic of any electrical machine in which the characteristic is, or may be made to be, a function of the quantity of current flowing in a control circuit, and in the operation of which there occur electrical variations having a frequency proportional to the quantitative measure of the characteristic to be controlled.

One object of the invention is to provide improved methods of and means for generating control current in a control system as above described.

Another object is to provide a control system in which the variation in the quantity of control current is responsive to the change in relative phase of the electrical variations that initiates a relative change in their frequency. The resulting comparative continuity of cause and effect tends to increase the sensitiveness of the control.

In any system for the automatic control of a characteristic whose value is measured by the frequency of an electrical variation the condition of fixity or change of the characteristic is determinable only with reference to some fixed standard of frequency. Further the variation relative to that standard must initiate the series of steps culminating in the flow of the required quantity of current in the control circuit. It is another object of the invention to use as the frequency standard resonant means the natural frequency of which is permanently fixed substantially at the value of the variation frequency corresponding to the desired value of control characteristic, and to utilize the relative change in phase between the two sets of variations to effect the control stated in the first object.

A feature of an alternative form of the invention is the use of a transmission network having a desired transmission characteristic as the frequency variation standard. A subsidiary feature is the use of this type of standard in a system in which the frequency of the variations impressed on this network may be different from that of the fundamental variation characteristic of the machine.

A specific object is to provide improved methods of and means for regulating the speed of a dynamo-electric machine utilizing part or all of the methods above stated.

These and other objects are accomplished in one form of the invention by impressing periodic electrical potentials derived from from the machine to be controlled on one of the cold electrodes of a three-electrode electric discharge device and separately impressing on the other cold electrode electrical potentials from an auxiliary frequency source which are of the same frequency but varying in phase relation with respect to the derived variations according to the frequency thereof. The controlling circuit of the machine is included in the output circuit of the device. When the speed, or other characteristic to be controlled, is such that there is opposition of the phases of the impressed potentials, no current (or a relatively small current) flows in the output circuit, or, therefore, through the controlling circuit. Any tendency toward a relative change of the characteristic to be controlled from this condition results first in a relative change of phase between the two sets of impressed potentials, which further results in a coincidence of positive potentials on the two cold electrodes during a short interval of time in each cycle of impressed potentials. A current will flow in the control circuit during these intervals. In order that use may be made of a variable quantity of control current to correct a change in speed in either direction from the normal the operation of the motor is made stable for one value of this quantity. A change of speed in either direction from the normal value will result in a corresponding variation of quantity of control current to correct the condition. A cause-and-effect relation therefore exists between the change in relative phases and the change in the quantity of current flow. The effect is greater proportionally than the cause. The two essential conditions that must exist in all automatic control systems are therefore satisfied.

A source of standard variations may be provided as a self-contained energy source of any type whatever for impressing a potential on the grid of a space discharge device or, as in the systems illustrated, auxiliary oscillations of a particular type may be obtained from oscillating means excited from the machine to be controlled. As stated above, a source of standard frequency may be provided for comparing the variations obtained from the machine whose frequency varies in accordance with the characteristic to be controlled. In such case the current in the controlling circuit is varied in accordance with the phase relation between the variations of standard frequency and the variations having a frequency according to the characteristic of the machine to be governed. In certain of the systems shown in the drawing a standard frequency is not provided but auxiliary variations are provided which have the same frequency as the variations obtained from the machine having a frequency varying according to the characteristic to be controlled. In such systems the auxiliary variations are subjected to a phase displacement which varies in accordance with the changes in frequency of the variations derived from the machine. The current flow in the regulating circuit varies in accordance with the phase relation between the two sets of variations in the same manner as when a set of variations is referred to variations of standard frequency. A third system may be that in which the auxiliary variations have a frequency much higher than the fundamental frequency of the variations derived from the machine. In such a system, the amount of current flowing through the control circuit is not varied in accordance with the phase relation between two sets of variations, but in accordance with the amplitude of the variations impressed upon the grid of the space discharge device as will be pointed out hereinafter.

In an alternative arrangement using an electrical oscillation circuit, instead of a tuning fork or other oscillating means of equivalent characteristic, a somewhat different method of operation is used. On account of the use of the electrical oscillation circuit, the oscillations initially produced at the free period are not sufficiently persistent to enable the control operations to be effected in accordance with the above described method except to a slight extent. Use is made of the variable transmission characteristic with frequency change. The oscillation circuit is tuned sufficiently above the desired frequency variation derived from the machine when the machine is operating at normal speed to cause that frequency to occur at about the middle of the ascending portion of its resonance curve.

A change in frequency of the variations derived from the machine results in a change in the amplitude and phase of the transmitted current. This current, or a corresponding potential variation, is impressed on the grid of the device. If the grid is normally biased so that the potentials impressed on it from the oscillating circuit are effective to vary the output current whenever the plate is positive there will be a change in amplitude of the impulse current flowing in the control circuit proportional to the variation in amplitude and phase of impressed grid potentials. This change may be caused to correct the undesired change in condition.

In this alternative method the frequency of the current impressed on the oscillation circuit must be proportional to the speed of the machine but not necessarily the same as the fundamental frequency of the machine. For example, the current may be derived from a separate generator synchronously driven by the machine and of a different frequency. For this case the grid potential variations are made effective to vary the output impulse current by utilizing the detecting action of the device, an expedient not necessary, where the two frequencies are the same and therefore where potential variations of only one sign are impressed on the grid while positive potentials are being impressed on the plate.

The invention will be more fully understood from the following description when read in connection with the accompanying drawing, in which each of the figures illustrates the application of the invention to the speed control of a direct current motor and in which specifically Fig. 1 illustrates a system the operation of which depends on the conjoint effect in the output circuit of a control device, of alternating potentials derived from the motor and from an auxiliary source, and in which the auxiliary source is a tuning fork separately driven from the motor;

Fig. 2 illustrates a system which utilizes as the control principle the variable transmission characteristics of an oscillating circuit;

Fig. 3 illustrates a circuit similar to that of Fig. 2 but in which the current impressed on the oscillating circuit is derived from the motor indirectly through a generator synchronously driven by the motor, and in that the two frequencies are different; and Fig. 4 illustrates a modification of the system of Fig. 3 in which the two frequencies are the same and in which a different type of generator is used.

In the various figures the motor, including the control circuit, the circuit for driving the motor, and the electric discharge device, are identical and the various parts of these elements are identically labeled.

The motor of the conventional shunt wound type. The poles of the magnetic field structure are represented by numeral 1. The field is excited by shunt winding 2 which is connected across the line, represented here by the battery 3, through switch 38. Potentials from source 3 are impressed through starting resistance 4 on the brushes 5 of the armature 6. The circuit 7 is connected to slip rings 8 and 9 which are permanently connected to two commutator segments 180 electrical degrees apart. During the operation of the motor alternating potentials are generated in the armature and are impressed on circuit 7. This arrangement is substantially the equivalent of that of an inverted rotary converter.

Winding 10 is a control winding in which controlling current flows responsively to any variation in speed of the motor to correct the condition resulting from such variation. Condenser 11 is connected in shunt to the control winding to stabilize the intermittent current impressed from the control circuit 12 so as to enable the control currents to be more effectively applied.

The electric discharge device 13 comprises the usual filamentary cathode 14, anode 15, and control electrode 16. The cathode is heated by battery 17.

*Description of the system of Fig. 1.*

In Fig. 1, current from the circuit 7, in which flows current having a frequency proportional to the speed of the motor, drives a tuning fork 18 by means of the electromagnetic driving means 19. The mechanical oscillations set up in the tuning fork are translated into electrical oscillations of identical frequency by means of pick-up or generator coil 20. The means 20 is included in circuit 21 which comprises besides the pick-up coil, the grid biasing battery 22 and the grid and filament of device 13. The tuning fork with its associated input and output circuits 7 and 21, respectively, constitutes a selective transmission system having a peculiarly sharp resonance characteristic. It also may be conveniently considered as a source of oscillations separately excited from the motor. For a more full description of a selective transmission system similar to that disclosed, reference is made to U. S. patent to Ricker No. 1,543,124, granted June 23, 1925.

Electrical variations having a frequency proportional to the speed of the motor are impressed through the control circuit 12 on plate 15 from circuit 23, branched from circuit 7, by means of transformer 24. Although the circuit for impressing these potentials is illustrated as in series with the control circuit 12 the two circuits may equally well be connected to the device 13 in parallel with each other.

*Operation of the system of Fig. 1.*

The system of Fig. 1 is set into operation by closing the switch 38 from battery 3 and gradually cutting out the resistance 4 as in the usual method of starting direct current shunt motors.

As the motor accelerates its speed will approach a value corresponding to the natural frequency of vibration of the fork. When a speed slightly less than this value is reached the fork will begin to vibrate. These vibrations, however, will not be of constant amplitude but will "beat" at a frequency equal to the difference between the fork frequency and the motor frequency.

When these beats are of maximum value the pick-up coil 20 will impress E. M. F. on the grid 16 which will cause a maximum space current through the discharge device 13 and the motor field 10. This will strengthen the field of the motor and tend to slow it down. Conversely, when the fork is at a minimum of amplitude during one of the beats the motor field is weakened and the motor tends to speed up. The average value of the field current during these beats is thus about half the maximum. As the starting resistance 4 is cut out further the average speed of the motor increases and the frequency of the beats of the fork decreases until during one of the periods of minimum amplitude of the fork vibrations the motor speeds up sufficiently to approach the frequency of the fork and the motor then "pulls into step" the field current making one or more swings (depending on the degree of damping) before steadying down to a fixed value which is slightly greater than the average value during the prior period of beats. The remainder of the resistance 4 may now be cut out. The fork now vibrates continuously and the potentials impressed on the grid and plate from the tuning fork and motor, respectively, have the same frequency and a substantial phase difference.

If the speed of the motor tends to increase above this value, the first effect will be a change in the relative phases of the two sets of impressed potentials. During a portion of each cycle of the impressed potentials there will be an interval, of progressively increasing length for successive cycles, during which both the plate and the grid will have positive potentials impressed on them. During these intervals current will flow in the control winding or will be superimposed on the normal impulse current flowing therethrough, depending on the biasing potential. The effect will be an increase in the current flowing in the control winding. This increase, according to the well known theory of motor operation, will tend to decrease the speed of rotation. The normal field of the motor is initially adjusted so that the operation of the motor is stable for this condition. If the relative speed of the motor tends to change upwardly or downwardly from this value the quantity of control current will correspondingly increase or decrease, accordingly automatically counteracting the tendency.

During the interval in which the speed of the motor tends to vary from and back to its normal value (due, for example, to variable load) the tuning fork continues to vibrate at its previous frequency so that the proportionality between the change in speed and the change in quantity of control current is preserved for a long enough period to insure a correction of the condition.

This method of control is very sensitive. This results both because the magnitude of the change in quantity of current with a small change in condition is relatively great and because of the very small time lag between the operation of cause and effect, since the control is set into operation by the relative change in phase with which the relative change in frequency commences.

*Description of the system of Fig. 2.*

Referring now to Fig. 2, the general arrangement of the system of this figure is similar to that of Fig. 1, and the method of operation is similar thereto in principle but somewhat different quantitatively. In this system the oscillation circuit comprising inductance 25 and condenser 26 is substituted for the mechanical selective circuit of Fig. 1. In order to adapt the system for operation at different frequencies, condensers of different capacities may be used or the condenser may be made variable. This tuned circuit is connected across a portion of the secondary of the transformer 24 so that it effectively constitutes a transmission network between circuit 7 and the electron discharge device. The potential across the condenser 26 is impressed on the grid-filament circuit of the device. The circuit of Fig. 2 differs also from that of Fig. 1 in that the filament 14 is energized by alternating current from the transformer 24 instead of by direct current. This feature is not necessary to the operation of the system. The filament energizing means of Fig. 1 and Fig. 2 may be used interchangeably in the systems of those figures.

*Operation of the system of Fig. 2.*

The oscillation circuit is tuned to a frequency sufficiently higher than the frequency corresponding to the desired speed of the motor so that the frequency of the current impressed from the motor on the oscillating circuit will vary over a range comprised within the ascending portion of the resonance curve of said circuit. The constants of the motor are so adjusted that the operation is stable with the value of impulse current flowing in the controlling circuit corresponding to a mean frequency within this portion of the resonance curve. When the speed varies from that condition a correspondingly variable impulse current will flow in the control circuit. For example, if the speed increases, and accordingly the frequency of the current impressed on the oscillation circuit increases, the current transmitted through said circuit correspondingly increases and there will be an increased variable potential impressed on the grid and also a change in phase of the potential on the grid with respect to the potential on the plate. The variations on the plate and the variations on the grid approach closer to an in-phase relation to effect an increase in the current in circuit 12. This increased current will flow in the controlling winding 10 and as in accordance with known principles tends to decrease the speed. In the operation of this system if the grid biasing potential is adjusted so that all values of impressed alternating potential are effective to vary the value of the impulse current that flows in circuit 12 during the half cycles when positive potentials are impressed on the plate, the relative phases of the impressed alternating potentials which change with the variations in frequency will control the current in the motor field winding.

To the extent that the oscillations transmitted through the oscillation circuit persist during the interval when the speed of the motor changes from the desired mean and is caused to return to that mean, the system will additionally function in the manner of the system of Fig. 1. However, the regulating effect resulting from this mode of operation will be relatively small unless the resonant qualities of the oscillation circuit are made much greater than it is in the usual case. For example, it is difficult to design an electrically tuned circuit having a time constant which is greater than a very small fraction of a second, whereas the corresponding time constant of a tuning fork may very easily be made to be several seconds.

In the operation of this system the oscillation circuit varies the phase relation of the potential impressed on the grid in the same manner as the resonant means and connections thereto in the system of Fig. 1. The electron discharge device functions, by virtue of the unilaterally conductive properties of its plate-filament circuit, as a rectifier of the potentials impressed directly from the motor. By virtue of its characteristics as a three-electrode device, the tube gives an output, in the rectified impulse current proportional to the variations in phase between the potentials impressed upon the grid and plate. The operation of the three-electrode device in this system differs from that used in a certain alternative method otherwise broadly the same. In that alternative method a direct current space source is used and an impulse current of substantially the same general form as in this invention is obtained by the detecting action of the three-electrode device with respect to the alternating potentials impressed on the grid, the grid accordingly being biased so that the operation occurs over a curved portion of the characteristic curve. The resultant variations in the output current are much smaller in amplitude than in the present invention in which the whole value of alternate half waves impressed on the grid, instead of the integrated effect of half waves of opposite sign and nearly the same value, are effective to produce the variations.

*Description of the system of Fig. 3.*

The system of Fig. 3 differs from that of Fig. 2 principally in the method of derivation of the current which is impressed on the oscillation circuit and in that the control is not based on phase shift of the grid potential with respect to the variations impressed on the plate. In the system of Fig. 3 this current is derived effectively from an individual generator synchronously driven by the motor. Armature winding 26 and inductor 27 cooperate as in conventional types of inductor alternators to generate in the armature winding an alternating current whose frequency is proportional to the speed of rotation and the number of teeth of the inductor. A magnetizing flux derived from the magnetic circuit of the motor flows in the magnetic circuit of the generator, which includes the field structure 28. The generation of alternating current in the armature is responsive to the variation of this flux as the inductor teeth pass the pole pieces 29 and correspondingly vary the reluctance of the air-gap in the magnetic circuit. Current from the armature is impressed on the oscillation circuit constituted by inductance 30 and condenser 31 through resistance 32. Condenser 31 may be variable for the reason stated in describing condenser 26 of Fig. 2. The potential variations across the condenser 31 are impressed on the filament and grid of the electric discharge device. The oscillation circuit of Fig. 3 differs from that of Fig. 2 only in that the impedance elements are so arranged therein as to constitute it a parallel, rather than a series, resonant circuit.

*Operation of the system of Fig. 3.*

The operation of this system differs greatly in one detail from that of Fig. 2 on account of the fact that the frequency of the current transmitted through the oscillation circuit is different from that of the current impressed on the plate of the device. In the specific form illustrated, the frequency of the current transmitted will be greater than that impressed on the plate in the proportion of the ratio of the number of inductor teeth to the number of pairs of motor field poles. In the system shown in Fig. 2 the frequency of the variations impressed on the grid of the tube is the same as the frequency of the variations impressed on the output circuit of the tube and the current flow through the field winding 10 is dependent on the phase relation as well as amplitude of the variations impressed on the grid with respect to the variations impressed on the plate. In the system shown in Fig. 3 the variations impressed on the grid have a much higher frequency than the frequency of the variations impressed on the plate and the current through the field winding 10 depends solely on the amplitude of the variations impressed on the grid. In order to make effective the variations in both directions of the potentials impressed on the grid during the relatively long intervals when positive potentials are impressed on the plate, the grid biasing potential must be adjusted so as to give an integrated effect in the output current. This requires that the grid potential be adjusted so that these potential variations occur over a curved portion of the grid-potential-plate-current characteristic curve. This expedient is not necessary in the operation of the system of Fig. 2 in which the variations of potential impressed on the grid occur in only one direction while the plate is positive.

The resistance 32 limits the current drawn from the pick-up device 26 so that the voltage of the oscillation circuit can vary.

*Description of the system of Fig. 4.*

The system of Fig. 4 is somewhat similar to that of Fig. 3, differing only in the specific types of generator and oscillation circuit and in that the control is dependent on the phase shift of the potentials impressed upon the grid of the tube with respect to the variations impressed upon the plate of the tube. In the system shown in Fig. 3, the current supplied to the regulating field 10 of the motor is dependent on the value of the potential impressed upon the grid of the tube, whereas in the system shown in Figs. 2 and 4 the current supplied to the regulating field 10 of the motor is dependent mainly on the phase relation of the potential impressed on the grid with respect to the variations impressed on the plate of the tube. In the system shown in Figs. 2 and 4, it will be noted the frequencies impressed on the input and output circuits of the tube are the same, whereas in the system shown in Fig. 3 the frequency impressed on the input circuit is much greater than the frequency impressed on the output circuit of the tube. In the system of this figure the generator is functionally entirely independent of the motor except that it is driven by it. It partakes more of the nature of a conventional alternator than of the inductor alternator of Fig.

3. The current is generated in armature winding 33 by means of variations in flux therethrough caused by rotating permanent magnet 34. Since the number of poles of this generator is the same as that of the motor, their frequencies are the same. The current from the generator is impressed on an oscillation circuit comprising inductance 35 and condenser 36 through resistance 37. The condenser 36 may be made variable, if desired, for the same reason as was described with reference to the condenser 26 of Fig. 2. The potentials developed across resistance 37 are impressed on the grid and filament of the device.

*Operation of the system of Fig. 4.*

Since the two frequencies are the same the electric discharge device does not need to be adjusted to function as a detector. The system operates on the phase shift of the potential impressed upon the grid of the tube in the same manner as the system shown in Fig. 2. The operation is, therefore, quite similar to that of the system of Fig. 2, so far as concerns the oscillation circuit and the device. Current from the generator armature winding 33 is impressed on the oscillation circuit and transmitted therethrough to the device. Variations in the speed of the motor and accordingly of the frequency of the impressed current result in a corresponding variation of the current transmitted through the oscillation circuit. In this system the resistance 37 functions in the same manner as the corresponding resistance in Fig. 3 and additionally as a source of variable potentials for the device. Except as pointed out the operation of the system is the same as Fig. 2.

The generator of this figure could readily be made to have more than two field poles in which case the two frequencies would be different. The system varied in this manner could be operated like the system of Fig. 3 by adjusting the device so that it functions as a three-electrode detector. Instead of making the number of field poles in the generator greater than the number of poles in the motor, the number of poles of the motor might be greater than the number of poles in the generator, so that the frequency impressed on the oscillation circuit would be less, rather than more, than the frequency of the currents impressed on the plate. This is true of the system of Fig. 3 equally well. The operation of such a system would not be essentially different from that described with reference to Fig. 3 where the relative magnitude of the frequencies is the converse.

Having set forth the novel principles involved in the invention and described in detail certain embodiments thereof, the parts, combinations, methods and apparatus believed to be new and patentable are defined in the following claims.

What is claimed is:

1. A control system for a dynamo electric machine comprising a controlling circuit for said machine, means for deriving from said machine electrical variations whose frequency varies proportionally to the variations in the quantitative measure of a characteristic of said machine to be controlled, a source of auxiliary frequency electrical variations, said derived and auxiliary variations varying with respect to each other in accordance with the frequency of the derived variations, an electric discharge controlling device having a pair of input and a pair of output electrodes, the latter being included in said controlling circuit, and means for impressing said derived and auxiliary frequency electrical variations each on an individual pair of said electrodes.

2. A control system for a dynamo electric machine comprising a controlling circuit for said machine, means for deriving from said machine electrical variations whose frequency varies proportionally to the variations in the quantitative measure of a characteristic of said machine to be controlled, a source of auxiliary frequency electrical variations including resonant means tuned to a standard frequency, an electric discharge controlling device having a pair of input and a pair of output electrodes, the latter being included in said controlling circuit, means for impressing said derived variations on said pair of output electrodes, and means for impressing said auxiliary frequency variations on said pair of input electrodes.

3. A speed control system for a dynamo electric machine comprising a controlling field winding for said machine, means for deriving from said machine electrical variations whose frequency varies proportionally with its speed, resonant means tuned to a standard frequency, means for impressing a portion of said derived variations on said resonant means to obtain auxiliary variations which have a phase displacement with respect to the derived variation, said phase displacement varying according to the frequency of the derived variations, and an electric discharge controlling device having input and output electrodes, the latter being connected to said controlling winding, and means for impressing said derived and auxiliary frequency variations respectively on said output and input electrodes, said derived variations and the auxiliary variations having a normal phase relation when the motor is operated at normal speed from which they approach opposite phase relation as the motor speed decreases and approach the same phase relation as the motor speed increases.

4. A speed control system for a dynamo electric machine comprising a controlling field winding for said machine, means for deriving electrical variations whose frequency varies proportionally with its speed, a source of auxiliary frequency electrical variations, means for varying the phase relation of the auxiliary variations with respect to the derived variations according to the frequency of the derived variations, a three-electrode electric discharge controlling tube, and means for impressing E. M. F.'s of the above mentioned derived and auxiliary frequencies respectively on the anode and control electrodes of said tube.

5. A control system for a dyamo electric machine comprising a controlling circuit for said machine, means for deriving from said machine electrical variations whose frequency varies proportionally with the quantitative measure of a characteristic of said machine to be controlled, resonant means tuned to a standard frequency, means for impressing a portion of said derived variations on said resonant means to obtain auxiliary variations, the potential of which auxiliary variations have a phase displacement from the derived variations which varies according to the frequency of the derived variations, and means comprising a non-distorting electric controlling device responsive conjointly to the derived and auxiliary variations to cause a correcting current to flow through said circuit according to the phase relation between said derived and auxiliary variations.

6. The system of claim 1 in which the source of auxiliary frequency electrical variations comprises means responsive to impressed electrical variations for resonantly producing electrical variations of the same frequency, and means for deriving said variations from the machine and for impressing them on said responsive means, said responsive means including means whereby the frequency of the variations produced does not materially change during the interval when the frequency of the impressed variations changes away from and is restored back to the resonant frequency of said responsive means.

7. The system of claim 1 in which the source of auxiliary frequency electrical variations comprises an oscillating element having relatively large inertia characteristics and small damping, and means for normally resonantly oscillating said element by variations derived from the machine and having a frequency proportional to the quantitative measure of the characteristic to be controlled.

8. The system of claim 1 in which the source of auxiliary frequency electrical variations comprises a mechanical vibrating means, and means for normally resonantly driving said element by and in accordance with variations derived from the machine.

9. A speed control system for dynamo electric machines comprising a controlling field winding for said machine, means for deriving from the machine electrical variations whose frequency varies proportionally with its speed, a mechanical vibrating means having large inertia characteristics and small damping, means for normally resonantly driving said vibrating means by and in accordance with variations derived from the machine and having a frequency proportional to its speed, means for producing electrical variations by and in accordance with said vibrations, and a controlling device responsive conjointly to the first mentioned derived variations and the variations produced by said vibrating means to cause correcting current to flow in said controlling field winding when the frequency of said derived variations tends to differ from the resonant frequency of the vibrating means.

10. A speed control system for dynamo electric machine comprising a controlling field winding for said machine, means for deriving from the machine electrical variations whose frequency varies proportionally with its speed, a three-electrode electric discharge device comprising an anode, a cathode and a control electrode, means for impressing said electrical variations on the anode and cathode of said device, means connecting said controlling field winding in circuit with said anode and cathode, a highly selective electric transmission path, means for impressing on said path electrical variations derived from said machine whose frequency is proportional to its speed, and means for impressing on the cathode and control electrode of said device the variations transmitted by said path whereby the rectified variations flowing in the anode-cathode circuit of the device and through the controlling path are responsive to variations in the amplitude of the transmitted variations, the speed of the machine and the resonant characteristics of the path being adjusted so that the operation of the system is stable when the frequency of the variations impressed on the path is on the ascending portion of its resonance curve.

11. A control system for maintaining a characteristic of a dynamo electric machine constant comprising a controlling field winding, a source of electrical variations whose frequency varies proportionally to said characteristic of the machine, an electron discharge tube having a cathode, an anode and a grid element, the output circuit of said tube being connected to said source of variations in series with said field winding, and means connecting the input circuit of said tube to the source of variations to vary the phase relation of the potential impressed on the grid with respect to the current in the tube output circuit according to variations in frequency of said source.

12. A speed control system for a motor comprising a controlling field winding, a source of electrical variations whose frequency varies proportionally to the speed of said motor, an electron discharge tube having a cathode, an anode and a grid element, the output circuit of said tube being connected to said source of variations in series with said field winding, and means connecting the input circuit of said tube to the source of variations to vary the phase relation of the potential impressed on the grid with respect to the current in the output circuit of the tube according to variations in frequency of said source.

13. A speed control system for a motor comprising a controlling field winding, a source of electrical variations whose frequency varies proportionally to the speed of the motor, an electron discharge tube having a cathode, an anode and a grid control element, the output circuit of said discharge tube serving to connect said source of variations to the controlling winding, and means resonant to a frequency above the frequency of the current from said source when the motor is operating at normal speed and connected to said source of variations for impressing a potential on the grid of said tube which varies in phase relation to the current in the output circuit of the tube according to the speed of said motor.

14. A speed regulator for a motor comprising a controlling field winding, an electron discharge device having a cathode, an anode, and a grid element, means for supplying alternating current to the output circuit of said device in series with said field winding, a source of electrical variations whose frequency varies proportionally to the speed of said motor, and means controlled by said variations for impressing other variations on said grid which are controlled according to the frequency of the electrical variations.

15. A speed regulator system for a motor comprising a controlling field winding, an electron discharge device having a cathode, an anode, and a grid element, means for supplying alternating current to the output circuit of said device to energize said field winding, a source of electrical variations whose frequency varies proportionally to the speed of said motor, and means comprising a circuit sensitive to frequency differences and controlled by said variations for impressing a potential on said grid to control the current flow in the controlling field winding of the motor according to the frequency of said electrical variations.

16. A regulator circuit for maintaining a characteristic of a dynamo electric machine constant comprising a controlling circuit for the machine, an electron discharge device having a cathode, an anode, and a grid element, means for supplying alternating current to the output circuit of said device to energize said controlling circuit, a source of electrical variations whose frequency varies proportionally to the characteristic of said machine, and means comprising a circuit sensitive to frequency differences and controlled by said variations for impressing a potential on said grid to control the current flow in said controlling circuit according to the frequency of said electrical variations.

In witness whereof, I hereunto subscribe my name this 28th day of October, A. D. 1924.

HUGH M. STOLLER.